Sept. 11, 1945.  V. W. BREITENSTEIN  2,384,529

MAGNETIC INSTRUMENT

Filed July 27, 1940  2 Sheets-Sheet 1

Inventor.
Victor W. Breitenstein
By McCaleb & Sheill
Attys.

Sept. 11, 1945.   V. W. BREITENSTEIN   2,384,529
MAGNETIC INSTRUMENT
Filed July 27, 1940    2 Sheets-Sheet 2
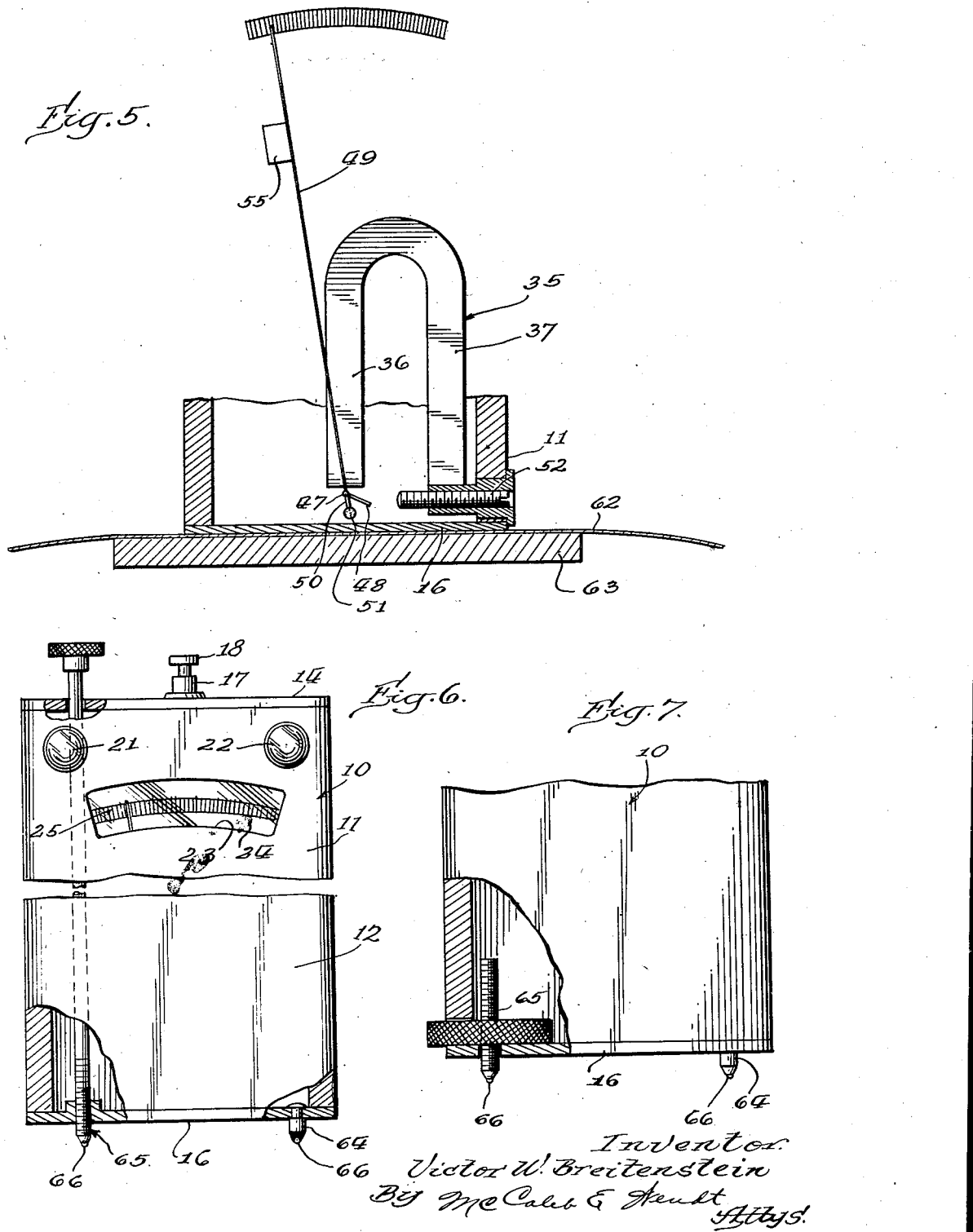

Patented Sept. 11, 1945

2,384,529

UNITED STATES PATENT OFFICE 2,384,529

MAGNETIC INSTRUMENT

Victor W. Breitenstein, Chicago, Ill., assignor to Illinois Testing Laboratories, Inc., Chicago, Ill., a corporation of Illinois Application July 27, 1940, Serial No. 347,839

4 Claims. (Cl. 33—147)

The present invention relates to magnetic instruments, and is particularly concerned with magnetic instruments adapted to be used for indicating the presence of magnetic metal, measurement of thickness, indication of thickness limits, or the like.

One of the objects of the invention is the provision of an improved magnetic instrument which is adapted to be used for the measurement of thickness of various articles, such as coatings, papers, or other relatively thin articles which are otherwise relatively difficult to measure.

Another object of the invention is the provision of an improved magnetic instrument which is adapted to indicate limits of thickness, or which may be used for comparing the thickness of different articles.

Another object of the invention is the provision of an improved magnetic instrument which is adapted to be used as a magnetic metal indicator so that it may be employed by the wardens or guards of prisons for detecting the presence of weapons or tools or other articles of a dangerous nature which are generally made of magnetic metal.

Another object of the invention is the provision of a magnetic instrument of the class described, which is sturdy, accurate, capable of being calibrated in various ways, and which may be used for a long period of time without necessity for repair.

Another object of the invention is the provision of an improved magnetic instrument of the class described, which does not require any electric energization in the form of batteries or other connections to supply circuits, and which may, therefore, be embodied in a portable form adapted to be used at any time or place.

Another object of the invention is the provision of a small self-contained pocket size instrument adapted to effect measurements of thickness, or to give indications of presence of magnetic metal.

Other objects and advantages of the invention will be apparent from the following description and the accompanying drawings, in which similar characters of reference indicate similar parts throughout the several views.

Referring to the drawings, of which there are sheets accompanying this specification, Fig. 1 is a view in perspective of a device embodying my invention;

Fig. 5 is a diagrammatic illustration of the indicating unit, shown in connection with an article, the thickness of which is to be measured with a block or plate of magnetic metal which is placed on the side of the article to be measured, opposite to the indicating unit.

Fig. 6 is a fragmentary elevational view in partial section, showing an adjustment for engagement with the material to be measured;

Fig. 7 is another similar fragmentary view of a modification.

Figure 1:
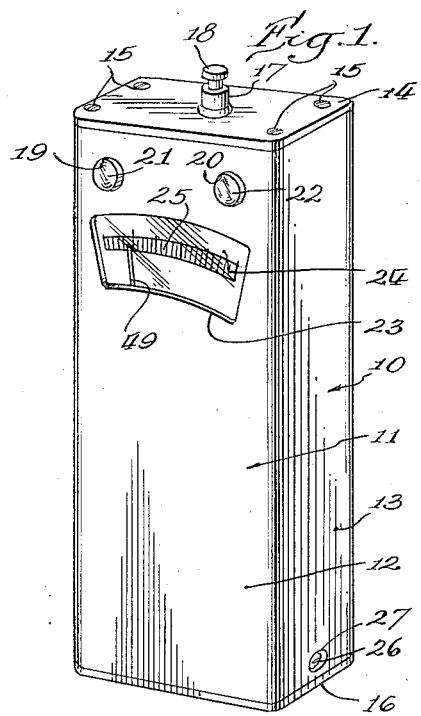

Referring to Fig. 1, 10 indicates the magnetic instrument, which is preferably enclosed in a housing, indicated at 11. This housing may consist of a box-like metal member made of non-magnetic metal, such as aluminum, or of insulating material, such as a molded condensation compound; and the housing 11 is preferably provided with the plane front and rear panels 12 and plane side panels 13, all of these panels being integrally joined together to form a box-like member open at each end.

The ends may be closed by means of a metal plate 14 of non-magnetic metal, such as brass, which may be nickel plated, and secured in place by a plurality of screw plates 15, passing through the cover plate and threaded into threaded bores in the side walls 12 and 13.

The upper and lower cover plates 14 and 16 may be identical in construction except that in one embodiment of the invention I employ signal lights. The upper plate is provided with a tubular guide member 17, providing a support for a slidably mounted insulating push button 18 used for actuating a switch, which is normally on open circuit.

When the device is provided with signal lights, the housing 11 has its front wall 12 formed with the window apertures 19 and 20, which are closed by means of the colored glass members 21 and 22. For example, the window 21 may be green, and the window 22, red, for the purpose of indicating the limits of measurement when the device is used as a thickness limit indicator.

The front wall 12 is also preferably provided with an arcuate window opening 23, which is covered on the inside by a pane of glass 24, and which exposes a dial 25, provided with suitable scale indicia for indicating the thickness of the material to be measured.

26 indicates an aperture in one side of the housing at the bottom for receiving a threaded sleeve 27, which supports an adjustment screw, the purpose of which will be later described in detail.

Figure 2:
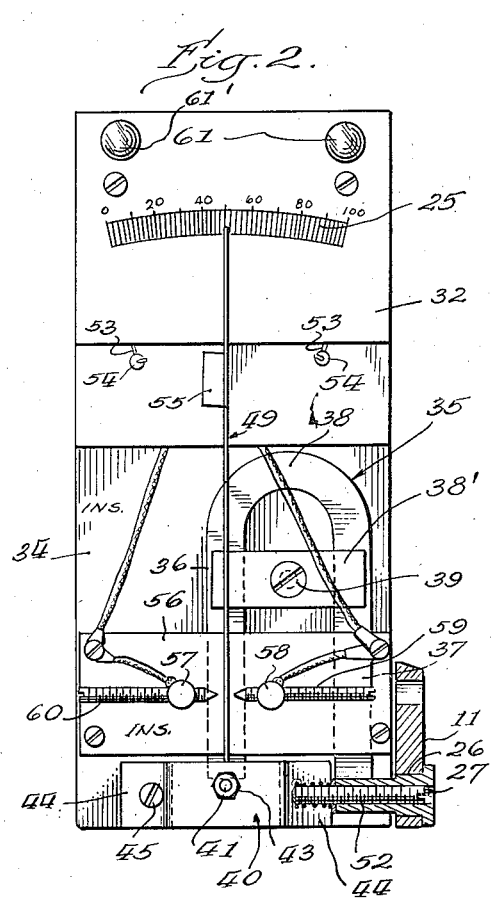
Fig. 2 is a plan view of the face of the instrument indicating unit when it is removed from the housing.
Figure 3:
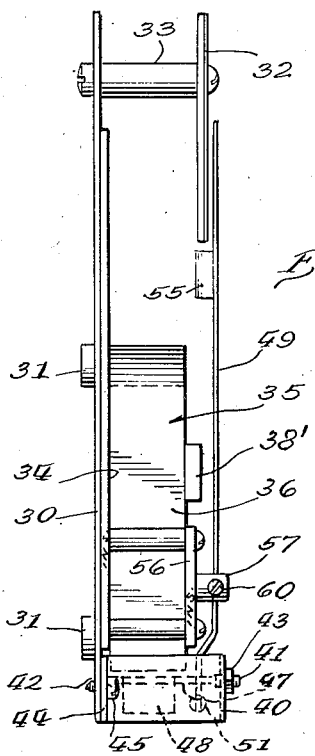
Fig. 3 is a side elevational view of the indicating unit.
Figure 4:
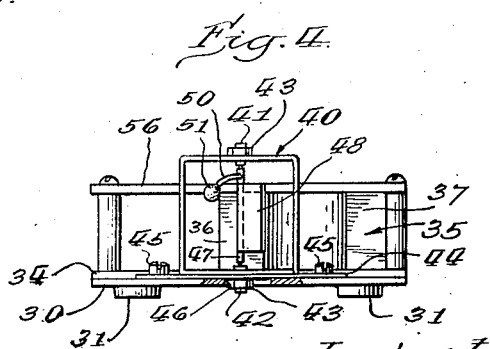
Fig. 4 is a lower end elevational view of the indicating unit.

The indicating unit, which is best illustrated in Figs. 2 to 4, preferably includes a supporting plate 30, upon which the complete unit is so mounted that it may be removed from the housing as a unit and slid out of either end of the housing.

This plate 30 is preferably of brass or other non-magnetic material, and provided on its rear side with a plurality of internally threaded sleeves 31, which are engaged by screws passing through the rear wall of the housing and threaded into the sleeve 31 to secure the unit in the housing.

At its upper end the supporting plate 30 preferably supports a dial plate 32 consisting of a rectangular metal plate which is covered with a layer of paper having an arcuate dial with scale divisions. The dial plate 32 may be secured in place by a pair of bolts passing through the dial plate and through spacing sleeves 33.

The plate 30 is preferably provided with an insulating bed plate 34 for the purpose of bringing the magnet 35 up to the proper level.

The magnet 35 preferably consists of a magnet of substantially U shape, having a pair of parallel legs 36, 37 joined by a yoke 38, and it may be secured on the supporting plate 30 by a non-magnetic cross bar 38', which engages the magnet, and which is secured to the plate by a through screw bolt 39 threaded into a threaded sleeve on the plate 30.

The magnet 35 is preferably disposed at one side of the supporting plate 30 so that its leg 36 is centrally located on the plate, and the leg 36 extends into a non-magnetic frame 40, which is provided with a pair of standard jewels supported by the screws 41, 42, and locked by means of lock nuts 43.

The frame 40 consists of a rectangular metal frame made of straps of brass, which is provided with laterally projecting flanges 44 that may be secured to the base 30 by screw bolts 45. The base 30 is cut out at 46 surrounding the lower jewel screw 42 and lock nut 43.

Pivotally mounted in the jewels carried by the screws 41, 42 the device is provided with a spindle 47, preferably of magnetic metal, such as steel, and the spindle 47 is soldered or otherwise secured to the edge of a rectangular vane 48 of magnetic metal, such as soft iron or Alnico.

The material of which the permanent magnet 35 is made is also preferably Alnico or some magnetic metal of high permeability.

The spindle 47 also has secured to its opposite side a light aluminum wire needle 49, which extends longitudinally of and above the leg 36 of the magnet and has its upper end moving above the scale divisions 25 of the dial.

An extension 50 of the needle wire, extended downward in the opposite direction to the needle, is provided with a counterweight 51 of solder or other suitable material so that the needle, vane, and spindle are in a state of balance.

The vane 48 extends in such a direction with respect to the spindle 47 that it is substantially tangential to the lines of magnetic flux which extend from the leg 36 to the leg 37 when the instrument is not being used.

This may, however, be adjusted by means of a screw bolt 52 of magnetic metal, which is supported in the threaded sleeve 27 of the housing 11.

The screw bolt 52 is located immediately adjacent the leg 37, and provides an extension for the leg 37 in the direction of the leg 36. As the screw bolt approaches the leg 36 it causes the flux to extend more directly across the space between the pole pieces and tends to move the vane 48 upward and to move the needle 49 toward zero.

Thus, the screw 52 provides a convenient form of zero adjustment, or the needle 49 may be adjusted by means of it to the middle of the dial, for use with contacts and signal lights, as a thickness limit indicator.

In some embodiments of the invention the spindle 47 may be provided with a return spring secured to the spindle and the frame 40 to bias the needle 49 back to the zero position.

The dial plate 32 may have a pair of wires 53 soldered to its lower edge and provided with upwardly turned ends for supporting small porcelain sleeves 54 serving as stop members for the needle 49.

The needle 49 may also have a depending piece of thin parchment or other stiff paper 55 secured to it and extending transversely to the direction of movement of the needle to effect a damping of the needle.

In some embodiments of the invention the supporting plate 30 may also support an insulating plate 56 which extends from one side of the unit to the other above the lower part of the magnet and is adapted to support the contact posts 57, 58, which have adjustable contact screws 59, 60 for engagement with the needle 49 at predetermined limits of movement.

These contact posts 57, 58 are connected by wires to the bulbs 61, 61', which are located below the green and red windows 21, 22, and the circuit is completed by the needle, which is grounded to the metal plate 30. Of course, a small standard dry cell may be housed in the housing behind the dial plate 32, and may have one of its terminals connected to ground, and the other terminal connected to the contact posts 57, 58 for energization of the lights 61, 61'.

In other embodiments of the invention the contacts 59 and 60 may control a thermionic amplifying circuit or a core reactor amplifying circuit, which in turn controls machinery or other devices.

When the device is used as a thickness limit meter, one of the limits of thickness is indicated by engagement of the needle 49 with the contact 60, illuminating the light 61' behind the green window 21. The other limit of thickness is indicated when the needle 49 engages the contact 59, illuminating the light 61 behind the red window 22.

The operation of the thickness measuring instrument is diagrammatically illustrated by Fig. 5, in which 62 indicates a piece of paper or other material, the thickness of which is to be measured; and 63 indicates a block of magnetic metal, such as soft iron, upon which the material 62 to be measured is placed.

The lower end of the housing of the instrument is then pressed against the paper, and under these conditions the magnet and vane are spaced from the block 63 of magnetic metal a distance which depends upon the thickness of the material 62.

The flux emerging from the legs of the permanent magnet 35 takes the path of least resistance, and a large proportion of the flux is thus diverted from the air path to the path through the magnetic metal 63.

Of course, there is always some leakage flux, but the position of the vane 48 is determined by the direction of the lines of flux, which traverse this vane from the leg 36 of the magnet 35 to the magnetic block 63, which may be regarded in the nature of a keeper or an armature.

The magnetic vane 48 tends to be located tangentially to the curved lines of flux within which it is located. Thus, the position of the needle varies with the spacing of the keeper 63 from the ends of the magnet 35. This spacing is, of course, dependent upon the thickness of the material to be measured. The scale divisions of the dial may be calibrated in any way, and I have found that the present instrument is capable of making measurements of thickness with a good degree of accuracy.

Referring to Fig. 6, this is a modification which is adapted to be used under conditions where a higher degree of accuracy is desired. The support of the material to be measured between the plane surfaces of the bottom of the housing and the keeper 63 is not conducive to the highest degree of accuracy because the spacing between these members depends upon the accuracy of the plane surfaces.

Therefore, in another embodiment of the invention the bottom plate of the housing may be provided with a three point support for engaging the keeper 63 in the form of two fixed downwardly projecting metal legs 64 and one adjustable downwardly extending non-magnetic metal leg 65.

Each of these metal legs may be provided with a cup at its outer end, which is used to secure a hardened ball 66 to the leg for the purpose of providing a uniform surface, which is not subject to excessive wear.

The adjustable leg 65 comprises a threaded rod, which may be made of non-magnetic metal and may be threaded into the lower housing plate 16, and may extend through the housing and an aperture in the upper housing plate 14, where its upper end will be provided with an adjustment knob, which may have scale indicia cooperating with a pointer on the housing.

In other embodiments of the invention, the rod 65 may be provided with an enlarged disc immediately inside the lower cover plate 16, and having its edge projecting through a slot in the housing to permit the actuation of the rod 65.

The adjustment rod 65 is preferably located adjacent the vane 48, and the three legs 64, 65 merely determine the spacing of the instrument assembly from the plane surface of the block of magnetic metal 63, with which it is used.

The magnetic instrument would then rest upon the material 62 to be measured, by means of the three legs 64—65, and the thickness would be measured at the point where the adjustable leg 65 makes its point of engagement with the material to be measured.

The zero adjustment of the needle may be set by means of an adjustable leg 65 when the instrument is directly engaging the keeper 63, and a higher degree of accuracy can be attained because the thickness is actually measured at one point.

It will thus be observed that I have invented an improved magnetic instrument which may be used for comparing thickness, for indicating limits of thickness, or for effecting a measurement of the thickness of thin materials, cuttings, or the like.

My thickness measuring instrument requires no energization, and is readily portable, and it may be used at any time and place. It is adapted to effect thickness measurement with a high degree of accuracy and speed, and it may be used for a long period of time without necessity for any repair or replacement of any of its parts.

I have found that for a measurement of materials within the range of thickness of twenty one-thousandths of an inch to thirty one-thousandths of an inch, no special adjustment of my device need be made.

My device may be embodied in gauges for measuring a thickness within the range of zero to fifty one-thousandths of an inch, with scale divisions of one-thousandth of an inch for each division. For ranges of greater thickness than fifty one-thousandths of an inch the sensitivity of the device increases somewhat.

Within a small portion of the scale the scale divisions may be proportional or of equal width; but for higher ranges the scale divisions should be spaced according to a logarithmic scale. The divisions are farther apart for low values and closer together for high values, which is highly desirable, as it facilitates the more accurate measurement of small increments.

The present gauges may also be used with curved surfaces, when equipped with the three legs and suitable calibration adjustments are made. When the device is equipped with limit contacts, it is also adapted to be used for automatic process control for the purpose of stopping the machine whenever the limits of thickness have been exceeded in either direction.

The present device may be used for detecting the presence of firearms or for detecting the presence of minute particles of magnetic material in the body, or in food products, and for locating pipes or conduits in walls.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a magnetic instrument the combination of a support with a permanent magnet having a pair of legs located adjacent each other and a thin pivotally mounted magnetic vane having its pivot located outwardly of one of said legs in such manner that the vane is adapted to extend tangentially to the curved lines of magnetic force which extend from one leg to the other leg, said instrument being calibrated in terms of thickness and being arranged and constructed to measure the thickness of a member interposed between an auxiliary plate of magnetizable material and the ends of said permanent magnet, and said vane having indicating means whereby the change in the direction of the lines of force may be indicated, one of said legs having an extension whereby it is longer than the other, and said longer leg having adjustable means extending toward said vane whereby the direction of the vane may be controlled for effecting a zero correction of the indicator.

2. In a magnetic instrument the combination of a support with a permanent magnet having a pair of legs located adjacent each other and a thin pivotally mounted magnetic vane having its pivot located outwardly of one of said legs in such manner that the vane is adapted to extend tangentially to the curved lines of magnetic force which extend from one leg to the other leg, said instrument being calibrated in terms of thickness and being arranged and constructed to measure the thickness of a member interposed between an auxiliary plate of magnetizable material and the ends of said permanent magnet, and said vane having indicating means whereby the change in the direction of the lines of force may be indicated, said support having a plurality of legs for engagement with the work which is to be located between said legs and said plate of magnetizable material.

3. In a magnetic instrument the combination of a support with a permanent magnet having a pair of legs located adjacent each other and a thin pivotally mounted magnetic vane having its pivot located outwardly of one of said legs in such manner that the vane is adapted to extend tangentially to the curved lines of magnetic force which extend from one leg to the other leg, said instrument being calibrated in terms of thickness and being arranged and constructed to measure the thickness of a member interposed between an auxiliary plate of magnetizable material and the ends of said permanent magnet, and said vane having indicating means whereby the change in the direction of the lines of force may be indicated, said support having a plurality of legs for engagement with the work which is to be located between said legs and said plate of magnetizable material, said legs being provided with hardened and rounded engaging surfaces for measurement of thickness at a higher accuracy.

4. In a magnetic instrument the combination of a support with a permanent magnet having a pair of legs located adjacent each other and a thin pivotally mounted magnetic vane having its pivot located outwardly of one of said legs in such manner that the vane is adapted to extend tangentially to the curved lines of magnetic force which extend from one leg to the other leg, said instrument being calibrated in terms of thickness and being arranged and constructed to measure the thickness of a member interposed between an auxiliary plate of magnetizable material and the ends of said permanent magnet, and said vane having indicating means whereby the change in the direction of the lines of force may be indicated, said support having a plurality of legs for engagement with the work which is to be located between said legs and said plate of magnetizable material, one of said legs being adjustably supported by threaded means.

VICTOR W. BREITENSTEIN.